Aug. 23, 1932.   W. E. GOLDSBOROUGH   1,872,933
ROTARY TRANSMISSION
Filed Jan. 15, 1929
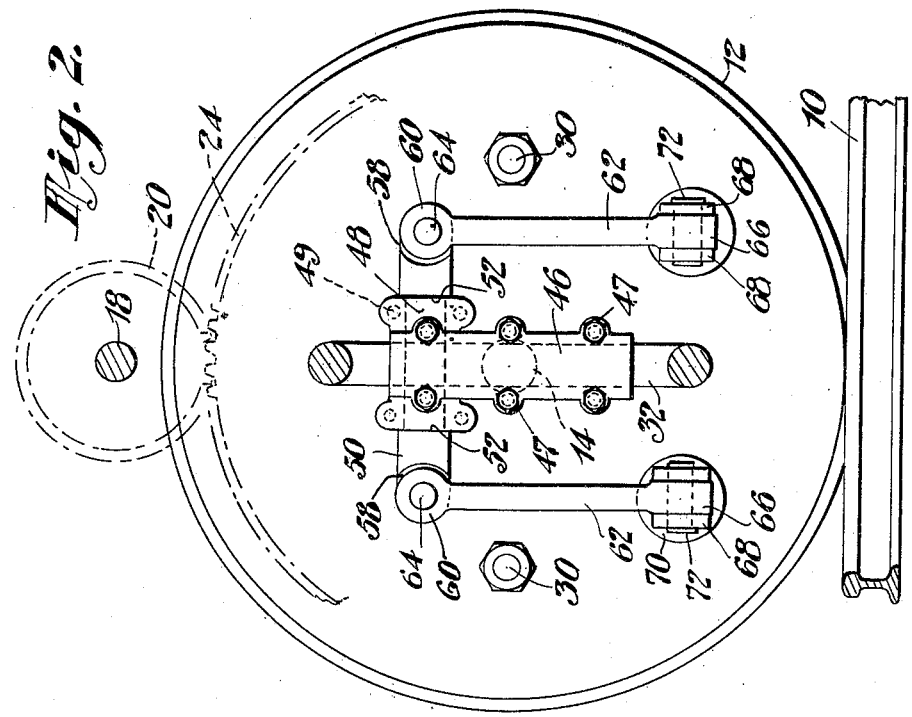
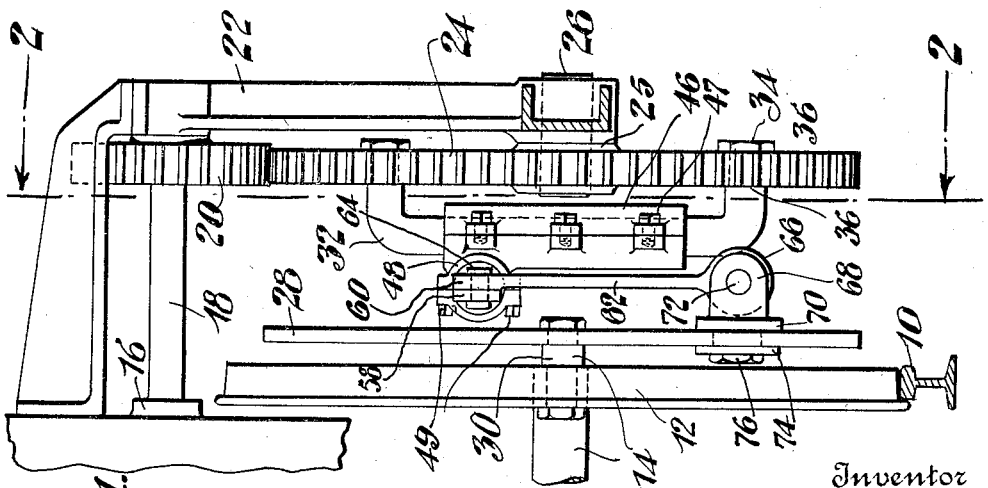
Inventor
WINDER E. GOLDSBOROUGH
By his Attorney Patented Aug. 23, 1932

1,872,933

UNITED STATES PATENT OFFICE

WINDER E. GOLDSBOROUGH, OF SOUTH NORWALK, CONNECTICUT, ASSIGNOR TO DOHERTY RESEARCH COMPANY, OF NEW YORK, N. Y., A CORPORATION OF DELAWARE

ROTARY TRANSMISSION

Application filed January 15, 1929. Serial No. 332,710.

The present invention relates to the art of flexible transmissions or couplings and more particularly to such couplings or transmissions adapted for heavy duty such as may be expected in electric locomotives and like machines.

The conditions under which motion is transmitted from the motor of an electric or other locomotive to the driver are severe in that not only is the amount of power transmitted high, but that the motor is, at least in large measure, mounted upon the spring supported frame of the locomotive. The relative motion between the spring supported frame and the track wheels or drivers requires that the high power or torque of the motor be transmitted to the wheels by mechanism capable of transmitting the motion of the motor to the wheels substantially without theoretical error or variation of angular movement irrespective of the eccentric movements and end play and canting movements occurring between the driving and driven parts due to the action of the springs.

It has been proposed to transmit motion from an electric or other motor to the drivers or driven wheels of an electric locomotive by means of a flexible coupling involving an intermediate member coupled to the driving member by one pair of links and to the driven member by a second pair of links. While it has been found that one of the pairs of links of said mechanism may be supplanted by a slide reducing theoretical error during the operation of the mechanism the practicality of such substitution has been questioned for the reason that the bearing pressure per square inch of bearing surfaces permitted in non-swiveling slide mechanisms is relatively quite low. It is an object of this invention to make the slide surfaces round to permit the slide structure to swivel as well as slide thereby giving the slide a more favorable bearing surface and further reducing theoretical error substantially to the vanishing point by means of the freedom of movement thus permitted.

It is the object of the present invention to provide a flexible transmission having an intermediate slide member mounted for rotation with the driving or driven member of a flexible coupling and coupled to the driven or driving member of the flexible coupling by a pair of links, the coupling as a whole being so arranged that the slide member may swivel as well as reciprocate, but without danger of canting or jamming the parts in use.

Further objects and advantages of the present invention will be apparent to those skilled in the art from the following description.

In the accompanying drawing, I have illustrated one embodiment of the present invention.

In said drawing, Fig. 1 is an elevational view of a portion of an electric locomotive including a flexible transmission in accordance with the present invention;

Fig. 2 is a section taken on the line 2—2 of Fig. 1 looking in the direction of the arrows.

Referring to the drawing, 10 is a rail of a railway track adapted to support a locomotive having track wheel 12, the axle of wheel 12 appearing at 14. A portion of an electric motor is indicated at 16, motor 16 being suitably mounted on the spring supported frame of the locomotive. The armature shaft of motor 16 is indicated at 18. Shaft 18 carries pinion 20 and the outer end of shaft 18 is journalled in an overhanging frame 22 which extends above and outside of track wheel 12. The plate-like gear 24 meshes with the pinion 20 and serves as the driving member from which motion is transmitted to the track wheel 12 by the flexible coupling or transmission in accordance with the present invention. Gear 24 is mounted to revolve on a stub shaft or pin 26 journalled in the frame 22. A plate member 28 is fixed to the wheel 12 by suitable bolts 30, 30 or the like. The plate 28 is mounted to revolve with the wheel 12 and, in the arrangement illustrated, the flexible transmission or coupling is connected between gear 24 and plate 28, parts of the transmission or coupling being fixed direct to each of members 24 and 28. It will be readily understood that plate 28 may be omitted and the parts attached directly to drive wheel 12. Gear 24 it will be seen is preferably in the nature of a plate for convenience in attaching the parts of the coupling.

The parts of the transmission providing the flexibility and the relative arrangement of such parts will now be described. As illustrated, a U-shaped piston, bar or rod 32 is fixed to the gear 24. The main portion of the bar 32 is spaced from the gear 24 and extends radially of the axis of rotation of the gear on each side of the axis. One end of the rod 32 is bent at right angles and extends through the gear 24, being fixed thereto by a nut 34. The nut 34 lies on the outside of gear 24 and acts to bind the gear between itself and a shoulder 36 formed on the bar 32 near one of its ends. Slidably and pivotally mounted on the radial portion of bar 32 is a sleeve or slide member 46. On the side away from the gear 24, the sleeve 46 is provided with an outstanding shoulder 48. The shoulder 48 lies near one end of the sleeve 46 and is hollowed out to form a journal or bearing within which is mounted a cross bar 50. The bar 50 extends substantially at right angles to the radial portion of the rod 32 and is swiveled in the shoulder 48. The bar 50 however is shouldered as indicated at 52, 52 so that it is prevented from sliding in the journal within the shoulder 48, the shoulders 52 on the bar 50 contacting with the ends of the shoulder 48. For convenience in assembling the slidable structure 46 is made in two parts which may be secured together by bolts 47. Similarly shoulder 48 is secured by bolts 49 to facilitate assembly of the bar 50 in the journal formed thereby. The ends of bar 50 are preferably flattened as indicated 58, 58. The flattened ends 58 of bar 50 lie in a given plane normally substantially parallel to the side of gear 24 and abut against the flattened ends 60 of a pair of links 62, 62. The flattened portions 58 of the bar 50 are pivoted to the flattened portions or eyes at the ends of the links 62 by pivot pins 64, 64 extending at right angles to the plane of gear 24 and of the plane of revolution of the parts. The other ends of the links 62 are also preferably made with flattened eyes indicated at 66, 66. The plane of the eyes 66 is at right angles to the plane of the eyes 60. The eyes 66 are pivoted to apertured ears or lugs 68, 68 fixed to members 70, 70. The pivots between the ears 68 and the eyes 66 are indicated at 72, 72. Pivots 72, it will be seen, lie on opposite sides of the bar 32 preferably substantially at equal distances therefrom and lie also in the same line. The pivots 72 extend substantially parallel to the plate 28 as well as substantially parallel to the bar 50 being, however, at right angles to the pivots 64. The members 70 to which the ears 68 are fixed are swiveled in the plate 28 being secured thereto by washers 74 and nuts 76.

It will be seen from the foregoing that if there is a relative radial or axial or canting motion between the driving member or gear 24 and the driven member or plate 28 that such motion will be accommodated by sliding movement of the member 46 on the bar 32 or by a combined sliding action of member 46 together with a pivoting or swiveling action of the member 46 and the other members of the coupling. However, the parts are so formed and arranged that relatively eccentric or radial movements of the driving and driven members and end play and canting movements of such members are accommodated not only substantially without mathematical error in the transmission of the rotary motion, but also without any tendency to jam or permanently cant the parts from the normal position illustrated.

While the drive has been described in connection with a frame overhanging the trackwheels and extending outside of the track rails, in which connection it is particularly adaptable, it will be evident to those skilled in the art that the invention is also useful in constructions where the pinion of the motor lies within the trackwheels and the flexible coupling or transmission also lies within the vertical planes of the two track rails. An example of such construction is shown in copending application of Robert G. Griswold and Winder E. Goldsborough Serial No. 332,706 filed January 15, 1929.

Although but a single specific embodiment of the invention has been described above, it will be obvious to those skilled in the art that various modifications may be made without departing from the principles herein set forth.

Having thus described the invention what is claimed as new is:

1. A flexible transmission comprising in combination a rotatably mounted member, a slide mounted to move transversely of the axis of rotation of said member, a second rotatably mounted member, and links pivotally connected to said slide and said second member, a cross bar swiveled on the slide, said links being pivoted to the cross bar and the cross bar being held against reciprocation transversely of the slide.

2. A flexible transmission comprising in combination a rotatably mounted member, a slide mounted to move transversely of the axis of rotation of said member, a second rotatably mounted member, and links pivotally connected to said slide and said second member, swivels on the second rotatably mounted member, said links having flattened ends pivotally connected to the swivels on the said second member, said last mentioned pivots being substantially parallel to the plane of rotation.

3. A flexible transmission comprising in combination a rotatably mounted member, a slide mounted to move transversely of the axis of rotation of said member, a second rotatably mounted member, and links pivotally connected to said slide and said second member, a cross bar swiveled on the slide, said cross bar having flattened ends and said links having flattened ends pivoted to the flattened ends of said cross bar, said last mentioned pivots being substantially perpendicular to the plane of rotation and the cross bar being held against reciprocation transversely of the slide.

4. A flexible transmission comprising in combination a rotatably mounted member, a slide mounted to move transversely of the axis of rotation of said member, a second rotatably mounted member, and links pivotally connected to said slide and said second member, a cross bar swiveled on the slide, said links being pivoted to said cross bar on pivots whose axes are at right angles to the plane of rotation, swivels on the second rotatably mounted member and pivots connecting the links to the swivels on said second member, said last mentioned pivots lying substantially in alignment and having their axes parallel to the plane of rotation.

5. A flexible transmission comprising in combination a rotatably mounted member, a second rotatably mounted member, and connections between said members including a slide, mounted to reciprocate transversely of the axis of rotation of said first member, said slide being mounted also to swivel about its line of reciprocating motion, a cross bar journalled on said slide and held against motion thereon endwise of the cross bar, said cross bar being substantially parallel to the plane of rotation of said second member and having flattened ends, links having flattened ends connected to the flattened ends of said cross bar by pivots extending normally substantially perpendicular to the plane of rotation of said second member, said links lying parallel to each other and being normally parallel to the plane of rotation of said second member and to the line of reciprocation of said slide, said links being flattened at their ends removed from said cross bar, swivels on said second member having flattened ears, said swivels being mounted to rotate on an axis substantially perpendicular to the plane of rotation of said second member, and pivots between the ears on said swivels and the last mentioned ends of said links and extending substantially parallel to the plane of rotation of said second member.

6. A flexible transmission including a driving and a driven element, a swivel and two links connected therewith, said swivel and two links lying normally in a plane parallel to said driving and driven elements, means whereby said swivel and two links lie in a common plane which cuts the planes of the driving and driven elements upon axial movement of said elements from the normal position.

7. A flexible transmission including a driving and a driven element, a central member comprising a slide and a swivel at right angles to one another, said slide being swiveled to one of said elements and said swivel being linked to the other of said elements.

8. A flexible transmission including a driving and a driven element, a central member comprising a slide and a swivel maintained at right angles to one another, said slide being swiveled to and sliding parallel to one of said elements, and said swivel being linked to and maintained parallel to the other of said elements.

9. A flexible transmission including a driving and a driven element, a central member comprising a slide and a swivel maintained at right angles to one another, said slide being swiveled to and sliding parallel to one of said elements, and said swivel being linked to and maintained parallel to the other of said elements, although the distance between said swivel and said element to which it is linked may be varied.

10. A flexible transmission including a driving and a driven element, a central member comprising a cross, means whereby the stem thereof slides and swivels at a fixed distance from one of said elements while its distance from the other of said elements varies, and means whereby the bar thereof moves parallel and at right angles to one of said elements and teeters in respect to the other of said elements.

11. The combination of a rotary driving member, a rotary driven member, a coupling intermediate said members for transmitting motion from said driving member to said driven member including a bar rigidly connected at its ends to one of said members so as to lie in a plane parallel thereto and intersect the projected axis thereof, a slide mounted upon said bar adapted to slide longitudinally thereon and to oscillate thereabout, and links connecting said slide to the other of said members by means equivalent to universal joints.

12. The combination of a rotary driving member, a rotary driven member, a coupling intermediate said members for transmitting motion from said driving member to said driven member including a structure connected to one of said members adapted to slide thereon in a line perpendicular to the axis thereof and to oscillate about said line and links pivoted to said structure and connecting the same to the other of said members.

13. A flexible transmission comprising in combination a rotatably mounted member, a slide mounted thereon to move transversely of the axis of rotation thereof, a cross bar swiveled on said slide, a second rotatably mounted member and links pivotally connected to said second rotatably mounted member and to said cross bar.

14. A flexible transmission comprising in combination a rotatably mounted member, a slide member mounted thereon to move transversely of the axis of rotation thereof, a cross bar swiveled on the slide, a second rotatably mounted member, links pivotally connected to said second rotatably mounted member and said cross bar and means to hold said cross bar against reciprocation transversely of the slide.

15. A flexible transmission comprising in combination a rotatably mounted member, a slide mounted thereon to move transversely of the axis of rotation of said member, a cross bar swiveled on the slide, links having flattened ends pivotally connected to the ends of said cross bar, a second rotatably mounted member, and swivels on said second rotatably mounted member connected to said links.

16. A flexible transmission comprising in combination a rotatably mounted member, a member slidably connected thereto, a cross bar swiveled on said member, a second rotatably mounted member and links pivotally connected to said second rotatably mounted member and to said cross bar.

17. A flexible transmission comprising in combination a rotatably mounted member, a slide mounted thereon to move transversely of the axis of rotation thereof and to swivel about its own line motion, a cross bar swiveled on said slide, a second rotatably mounted member and links pivotally connected to said second rotatably mounted member and to said cross bar.

18. In in a flexible transmission a driving element, a driven element, connecting means therebetween including a member mounted to slide transversely of the axis of rotation of one of said elements and to swivel about its slide, and parallel links pivoted thereto and connecting the other of said members to said slidable member.

In testimony whereof I affix my signature.
WINDER E. GOLDSBOROUGH.